United States Patent [19] [11] Patent Number: 5,077,729
Wong [45] Date of Patent: Dec. 31, 1991

[54] TESTING OPTICAL FIBER LINKS
[75] Inventor: Sover W. S. Wong, Beeston, United Kingdom
[73] Assignee: Gec-Plessey Telecommunications Limited, England
[21] Appl. No.: 486,432
[22] Filed: Feb. 28, 1990
[30] Foreign Application Priority Data
Mar. 28, 1989 [GB] United Kingdom ............... 8906937
[51] Int. Cl.$^5$ .......................... H04J 1/00; H04B 10/00
[52] U.S. Cl. ...................................... 359/110; 359/124
[58] Field of Search ..................... 370/3, 1; 350/96.15, 350/96.16; 455/601, 612, 607

[56] References Cited
U.S. PATENT DOCUMENTS
4,557,553  12/1985  McLandrich ........................... 370/1
4,642,804  3/1987   Personik ................................. 370/3
4,704,713  11/1987  Haller et al. ........................... 455/601
4,834,481  5/1989   Lawson et al. ......................... 370/1

OTHER PUBLICATIONS
"The Uses of Optical Switches in Fibre Optic Local Area Networks", pp. 7/1-7/4, Mar. 17, 1989, read at a Colloquium on Fibre Optic Lans and Techniques for the Local Loop, by D. K. Hunter et al.

Primary Examiner—Curtis Kuntz
Assistant Examiner—Kinfe-Michael Negash
Attorney, Agent, or Firm—Kirschstein Ottinger, Israel & Schiffmiller

[57] ABSTRACT

An apparatus for testing optical fibre links in a data communication network includes communication equipment (13) for generating and receiving traffic over one or more fibre links X at a wavelength λ2, optical test instrumentation (10) for generating test signals at a wavelength λ1, different from λ2, and circuitry (11) for superimposing a test signal from the test means onto a traffic signal from the communication equipment (13).

1 Claim, 5 Drawing Sheets

TESTING OPTICAL FIBER LINKS

BACKGROUND OF THE INVENTION

1. Field of the Invention

The present invention concerns operations within telecommunication networks. Such networks contain many nodes. The function of each node is to relay and distribute information to other nodes or termination units. A node can be a single equipment, a complete system, or a small self-contained network. Each node is connected to other nodes using electrical, optical, radio, or satellite links.

2. Description of Related Art

If the link between two nodes is broken, or its performance is severely degraded, then the communication or traffic between the two nodes will fail. Therefore in telecommunications networks, it s necessary regularly to monitor the performance of all the links to identify any potential faults and in the event of a link failure to determine the location of the fault so that repair work can be started.

Normally testing of a link is performed when the traffic is off-line, i.e. when the traffic is removed from the link. Hence traffic is disrupted and communication between nodes is not possible during the testing periods. In addition, to test all the links on the network, a test facility must be provided for every node in the network. This latter requirement is very costly to the carriers, e.g. the companies who are providing the transmission service.

SUMMARY OF THE INVENTION

The present invention is concerned with testing optical links in telecommunications networks.

An object of the invention is to provide test equipment which can be used without disrupting or introducing error to the normal traffic carried by the links and to reduce the need for a test facility at each node.

Accordingly the present invention provides a data communications network comprising a node having communication equipment for generating and receiving traffic at a wavelength $\lambda 2$ over one or more optical fibre links connected to the node, optical test means for generating test signals at a wavelength $\lambda 1$, different from $\lambda 2$, and means for superimposing a test signal from the test equipment onto the or each of the optical fibre links.

BRIEF DESCRIPTION OF THE DRAWING

In order that the present invention may be more readily understood, an embodiment thereof will now be described by way of example and with reference to the accompanying drawings, in which.

DETAILED DESCRIPTION OF THE PREFERRED EMBODIMENTS

The testing of optical fibre links is normally carried out using a dedicated optical test instrument known as an Optical Time Domain Reflectometer (OTDR). This measures the optical loss and distance from the instrument to a fault on the link. OTDR's operate on the "back scatter" principle and only require a connection at one end of a link for all measurements. In optical fibres back-scatter reflection occurs throughout the entire length of the fibre, and the reflected amount of back-scatter per unit length is roughly constant. As the reflected light travels back to the source it is attenuated by the insertion loss of the cable. Hence by measuring the amount of returned light at different time intervals the insertion loss versus distance characteristic of the cable can be determined. As the amount of back-scattered light in optical fibres is minute and when attenuated over long distances cannot be measured directly. Signal processing using auto-correlation techniques is used to improve the measuring range of OTDR's. Basically spliced/connector joints, the far ends of cables and breakages cause additional internal reflection which show up as a large impulse followed by a steep drop in signal strength. Hence it is possible to check the condition of joints on the locations of breaks by comparing a current reading with a previous one. Since instruments of the kind just described can only test one link at a time, a multi-way optical commutator switch is used in conjunction with it to selectively test the individual optical links terminated on a node. As the transmission parameters (optical loss) on an optical link is wavelength dependent, the instrument is usually selected to perform the tests at the working wavelength of the link, e.g. at 1300 nm. This, however, implies that the traffic on the link must be off-line during the tests so that disruptive off-line testing is needed.

The present invention uses an OTDR to test the optical links, but the tests are performed at a different wavelength to the traffic signal, e.g. at 1550 nm. Although the optical loss measurements do not reflect the true working characteristic of the link, the results can be converted to corresponding results for the link's operational wavelength. The instrument's distance measurement, however, is not wavelength dependent and hence the distance to the fault location measurement is unaffected.

Figure 1:
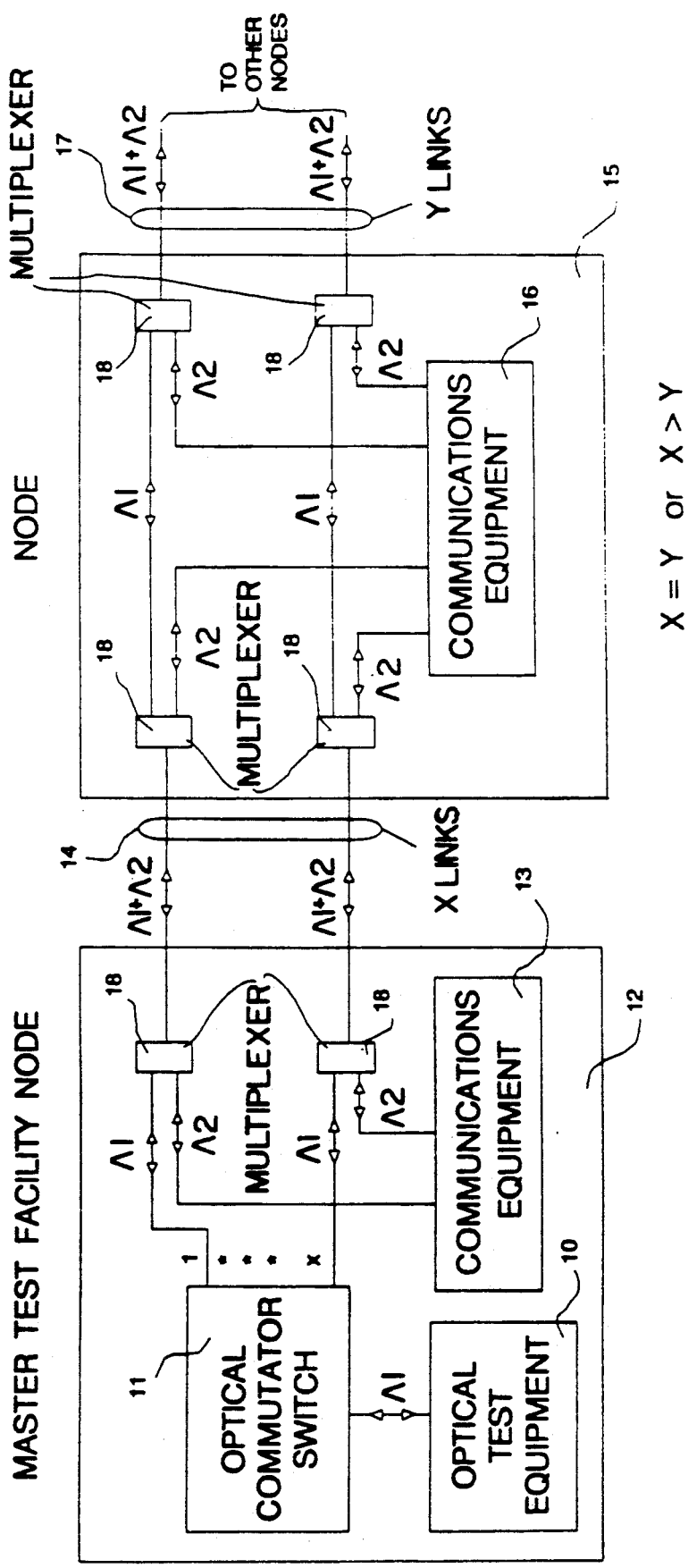
FIG. 1 is a block diagram showing one embodiment of a data distribution network incorporating an optical fibre link testing apparatus and according to the present invention.

An embodiment of apparatus for carrying out the invention is shown in FIG. 1 of the drawings. In this Figure a standard OTDR is shown at 10 and an optical commutator switch at 11. These two devices are part of a Master Test Facility Node 12. The node contains optical communications equipment indicated at 13 which is capable of transmitting and receiving data over a plurality of optical fibre links 14. In this embodiment the traffic is sent at a wavelength $\lambda 2$ and there are X links 14. These links 14 are connected to a further node 15 containing communications equipment 16 and having Y optical fibre links 17 for carrying traffic to a still further node which is not shown. In this embodiment X is equal to or greater than Y.

So far the various elements described have been conventional and in accordance with normal practise a test facility would be required for each node.

However, as already mentioned in the present embodiment the OTDR 10 generates its test signal at a wavelength $\lambda 1$, different from $\lambda 2$. For example the traffic wavelength λ2 of links 14 and 17 could be 1300 nm and test wavelength λ1 1550 nm. As the test and traffic wavelengths are different the test signals are superimposed on top of the traffic signals by optical devices 18 in the form of Wavelength Division Multiplexers (WDM's). The WDM's 18 also act to separate the test signals from traffic at each of the nodes. WDM's are well known and one type in use employ optical interference filter technology to either couple or decouple optical signals of differing wavelengths.

As well as allowing testing to be carried out without interfering with traffic the test signals filtered at a terminating node can be recombined with other traffic signals. Hence the test signals from the test node can be extended to many other nodes providing that the measuring range of the test facility has not been exceeded. This gives the important advantage that a test facility is not needed at every node.

Figure 2:
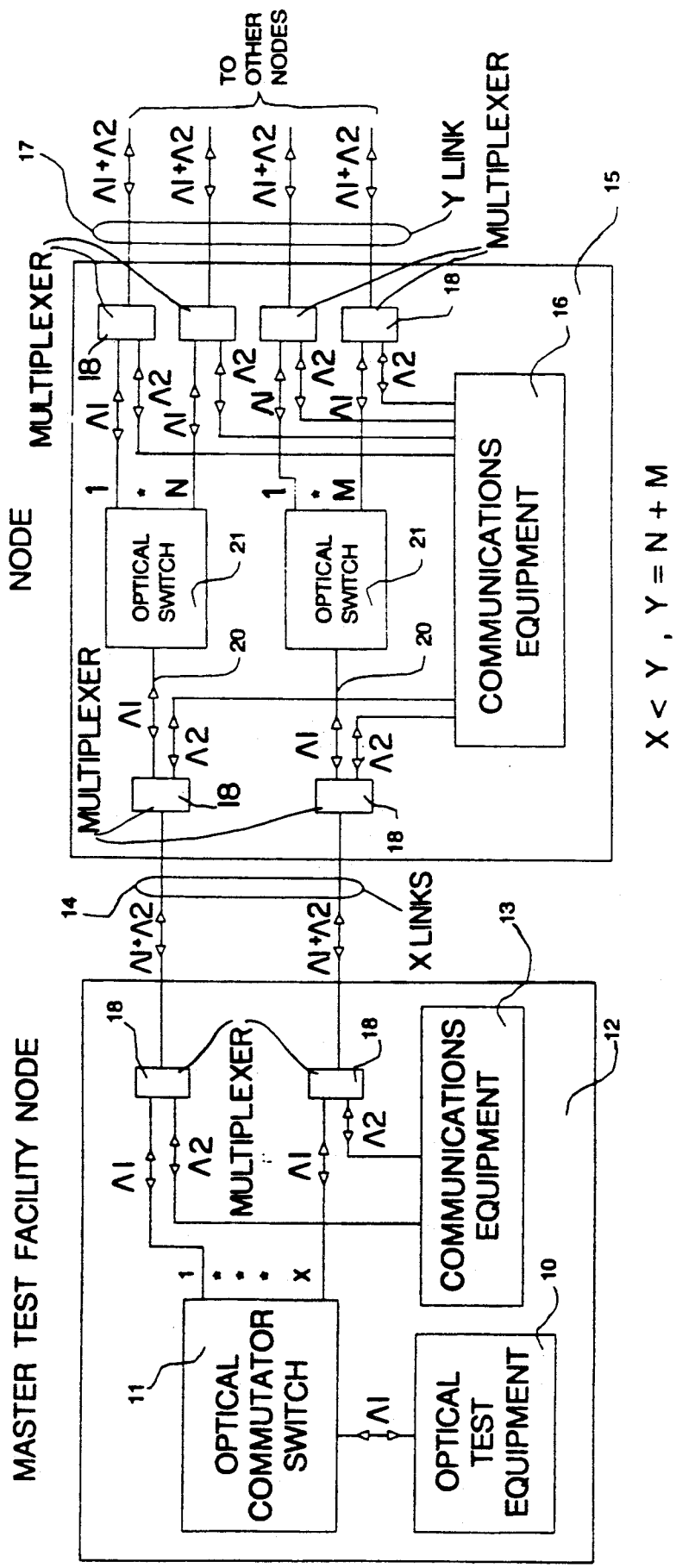
FIG. 2 is a modification of the embodiment of FIG. 1.

Referring now to FIG. 2 of the drawings this shows a modification of the embodiment of FIG. 1. In this figure integers which perform the same function as those in FIG. 1 have been given the same reference numerals. In the embodiment of FIG. 2 the number Y of fibres 17 leaving node 15 is greater than the number X of fibres leaving the Master Test Facility Node 12. Thus the outputs 20 of the devices 18 are taken to optical switches 21 where the λ1 signals are re-routed so that the greater number of fibres 17 interconnecting node 15 to the further node or nodes (which is or are not shown) can be accommodated.

Figure 3:
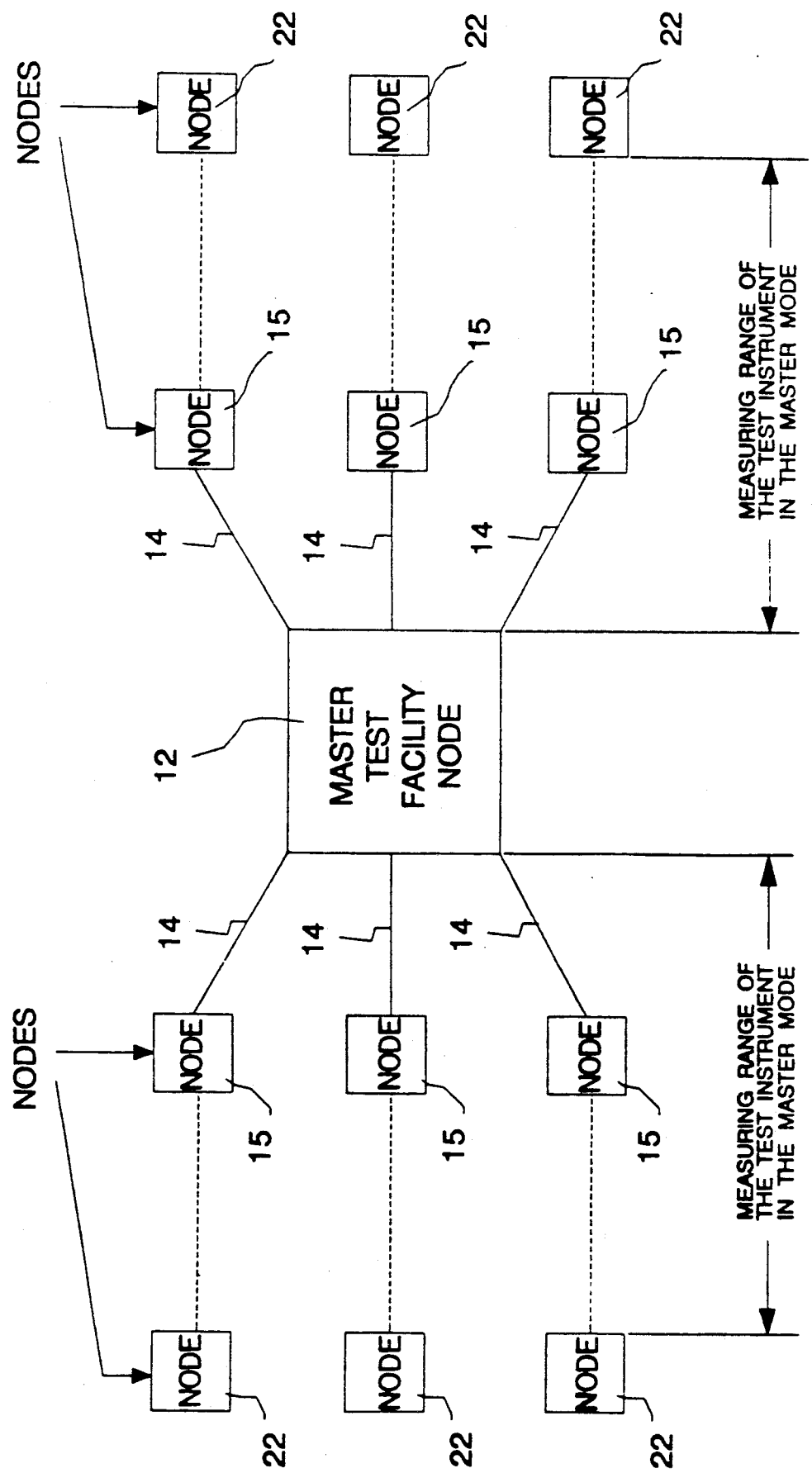
FIG. 3 shows a star network using the present invention.

It will be appreciated that the present invention can be employed in all the common network configurations. FIG. 3 of the drawings shows it in use in a star network. The Master Test Facility Node 12 is connected by fibres 14 to other nodes 15 which can be similar to the node 15 as shown in either FIG. 1 or FIG. 2. Additionally the nodes 15 are connected to further nodes 22. The number of nodes in each line 12 - 14 - 15 - 17 . . . . . . 22 is dependent on the range of the OTDR in the Master node 12.

Figure 4:
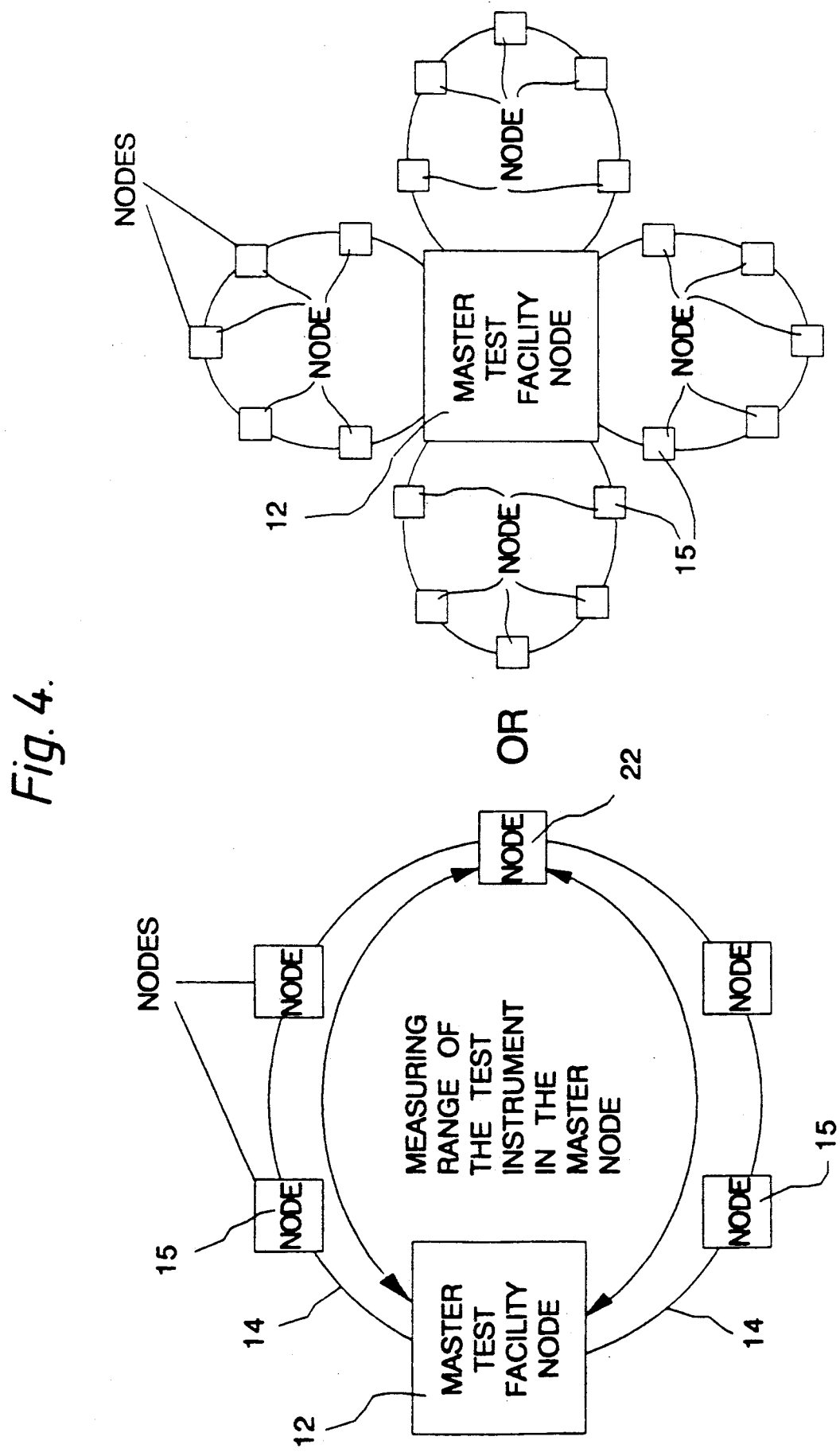
FIG. 4 shows ring networks using the present invention.
Figure 5:
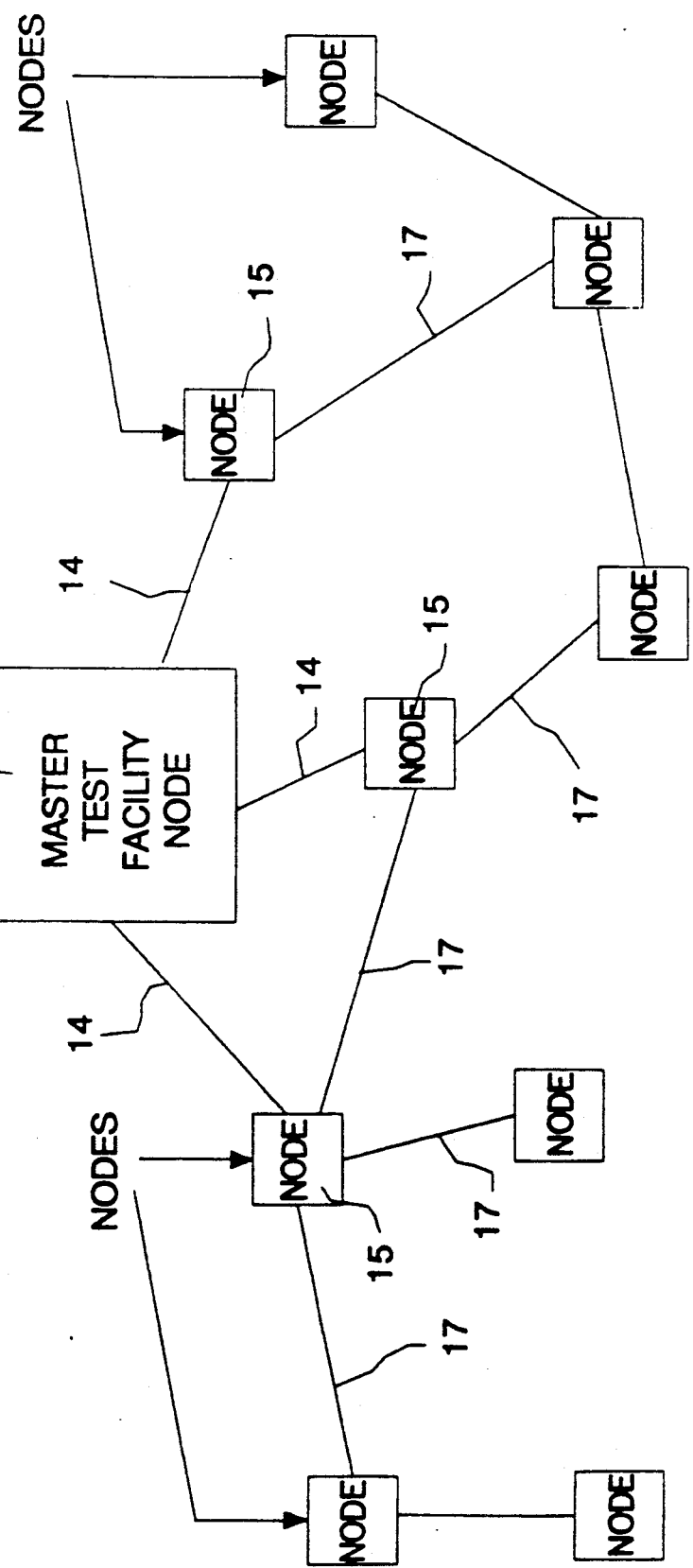
FIG. 5 shows a mesh network using the present invention.

FIG. 4 of the drawings shows alternative methods of using the invention in ring networks whilst FIG. 5 shows a single master node 12 in a mesh network.

In both cases the number of nodes which can be linked to a single Master Test Facility Node will depend on the range of the test instrument in that node.

I claim:

1. A data communications network, comprising:
    (a) a first node having communication equipment for generating and receiving traffic signals at a wavelength λ2 over a plurality of optical fibre links connected to said first node,
    (b) optical test means for generating test signals at a wavelength λ1, different from wavelength λ2,
    (c) means for superimposing a test signal at wavelength λ1 from said optical test means onto each of said optical fibre links,
    (d) a second node having communications equipment for receiving data from, and transmitting data to, said first node over said optical fibre links at wavelength λ2,
    (e) a third node connected to said second node via further optical fibre links and having communications equipment for receiving data from, and transmitting data to, said second node at wavelength λ2,
    (f) means at said second node for separating said test signals at wavelength λ1 from said traffic signals at wavelength λ2 received from said first node, and
    (g) means for combining said separated test signals at wavelength λ1 with traffic signals at wavelength λ2 to be sent from said second node to said third node, whereby the testing ability of said optical test means at said first node can be extended beyond said second node to said third node without the need for optical test means at said second node.

* * * * *